United States Patent Office 3,389,296
Patented June 18, 1968

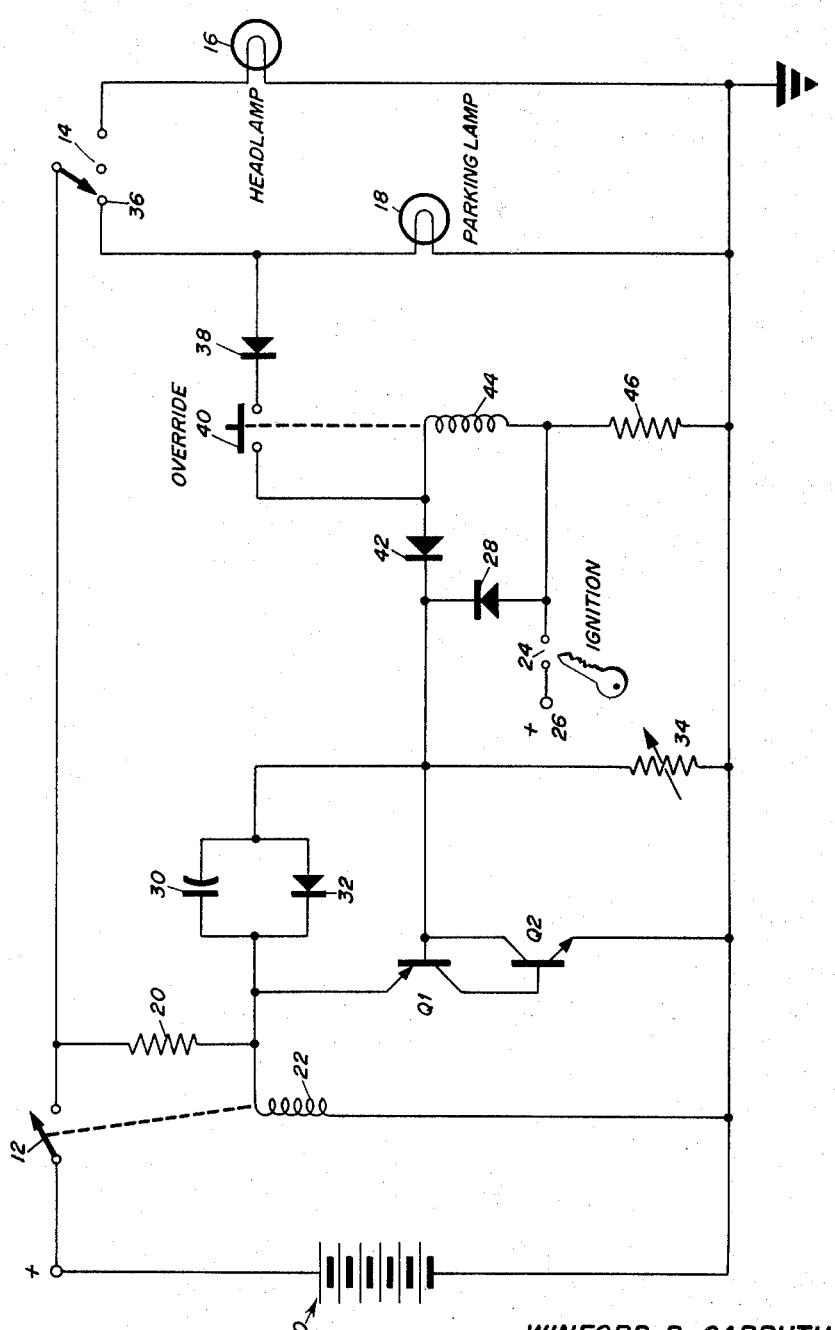

3,389,296
AUTOMATIC AUTOMOBILE LIGHTING CONTROL CIRCUIT WITH TIME DELAY-DEENERGIZING MEANS
Winford B. Carruth, Baltimore, Md., assignor to The Bendix Corporation, Baltimore, Md., a corporation of Delaware
Filed Apr. 4, 1966, Ser. No. 539,890
5 Claims. (Cl. 315—77)

This invention relates to an automatic time delay circuit and more particularly to an automatic time delay circuit for controlling automobile lighting circuits.

High on the list of unpleasant experiences of automobile operators are those of having to blindly negotiate the distance from parked automobile to residence in the dark, and of having insufficient power to start the engine due to the inadvertent leaving of one of the lighting or accessory circuits operating during a prolonged absence from the vehicle. While the prior art is replete with examples of circuits for disabling the lighting systems of an automobile a predetermined time after the removal of the ignition key or upon the cooling of the automobile engine, no circuit has provided the economy, reliability and convenience demanded by modern automobile owners. It is accordingly an object of this invention to provide an improved time delay circuit for disabling the auxiliary circuits of an automobile.

Another object is to provide auxiliary circuits which require the presence of the key in the ignition for initial operation.

Still another object is to provide a circuit for automatically disabling the auxiliary circuits a predetermined but variable time after removal of the ignition key, irrespective of engine or ambient temperatures.

Yet another object is to provide means for manually overriding the automatically disabling circuit when convenient to do so.

A further object is to provide a reliable, simple and inexpensive transistorized circuit wherein component long life is assured due to transistor conductance only for the generation of a disabling pulse.

The above and other advantages will be made more apparent by a reading of the following specification in conjunction with the accompanying drawing.

The single figure of the drawing is a schematic circuit diagram of the invention.

Referring now to the drawing, the headlamp circuit can be traced from a source of power 10, ordinarily the automobile battery, through a normally open relay 12, selector switch 14, and headlamp 16 to ground. Likewise the parking light circuit can be traced from source 10 through relay 12, selector switch 14 and parking lamp 18 to ground. It is apparent that energization of either circuit requires that the contacts of relay 12 be closed to supply power to manually operated selector switch 14. Switch 14 may be located conveniently on the dashboard of the automobile. Relay 12 can be initially energized only by closing the automobile ignition switch 24, thus establishing a circuit from source 26, which may be the same as source 10 through ignition switch 24, forward biased diodes 28 and 32 and coil 22 to ground. With the contacts of relay 12 closed, a holding circuit is maintained from source 10 through the relay contacts, resistor 20 and coil 22 to ground. A trigger circuit formed by transistors Q1 and Q2 is connected across coil 22. This circuit when conductive, is of much lower resistance than coil 22. Consequently little current then flows from the source 10 through coil 22. Transistor Q1, however, is non-conductive with switch 24 closed since the voltage applied to the base electrode is higher than that applied to the emitter electrode. This voltage difference is due to the off-set voltage of diode 32 equaling about 0.6 v. and capacitor 30 is charged to that value.

Relay 12 is self-holding as has been previously explained and thus opening the ignition switch 24 initially produces no modification of the lighting circuits. As the charge on capacitor 30 is drained off through resistor 34, a point is reached when the base voltage of transistor Q1 is sufficiently lower than the emitter voltage to cause transistor Q1 to conduct. Transistor Q1 and Q2 are connected in regenerative fashion and almost instantaneously short out coil 22 by providing a highly conductive path to ground. This allows the contacts of relay 12 to open thus deenergizing selector switch 14 and extinguishing all lamps irrespective of the position of switch 14. A transient across coil 22 is induced by the difference in potential to the coil between that supplied through the closed ignition switch and diodes 28 and 32 and that supplied through resistor 20. Capacitor 30, being connected across the base and emitter electrodes of transistor Q1, effectively bypasses this transient and prevents the premature triggering of transistors Q1 and Q2. The time delay between ignition switch opening and circuit deenergization is a function of the time constant of resistor 34 and capacitor 30, which may be manually varied to suit the convenience of the individual.

As is apparent from the above discussion, the closure of ignition switch 24 applies voltage to the base of transistor Q1 thus insuring that it remains non-conductive. Occasions arise, however, when it is desirable to leave the automobile with the parking lights on for a period longer than the timing circuit of transistor Q1 will allow. A parking light circuit override switch 40, conveniently located on the dashboard, is therefore provided so that voltage can be applied to the base of transistor Q1 from the parking lamp contact 36 of selector switch 14 through diodes 38 and 42. Override switch 40 is of the self-latching type since the manual closing thereof also establishes a circuit through holding coil 44 and resistance 46 to ground. The self-latching feature of override switch 40 is, however, disabled whenever switch 24 is closed. Thus the latching of override switch 40 can occur only after switch 12 has been closed with the selector switch 14 in the parking light position, and after ignition switch 24 is opened. In other words, override switch 40 can be effective in preventing the delayed turn off of the lighting circuits only after the ignition switch has been opened and then only for the purpose of maintaining the parking lamps lighted.

The foregoing description is to be considered only as illustrative of the invention. Many modifications and adaptations will readily occur to those skilled in the art. Obviously the invention may serve other control functions, for example, to cause heater controls to be returned to a preferred starting position or disabled whenever the ignition is turned off. The invention is to be regarded as limited only to the suitable modifications and equivalents falling within the scope of the appended claims.

The invention claimed is:

1. In an automobile having a storage battery and an electrical ignition system including an ignition switch, a control circuit for automatically disconnecting an electrical load from said storage battery after a fixed delay from the time of opening said ignition switch; comprising
   a relay having normally open contacts, connected between the automobile battery and the load to be controlled, and an operating coil;
   a resistor connected from the load contact of said relay to its coil for energizing said coil when said contacts are closed;
   means connecting said relay coil to said ignition switch for energizing said coil whenever said ignition switch is closed;

a regenerative trigger circuit connected across said relay coil for short circuiting said coil upon conduction of said trigger circuit;

means for biasing said trigger circuit into non-conduction whenever said ignition switch is closed; and a discharge circuit connected to be charged when said ignition switch is closed and to discharge when said ignition switch is opened, said discharge circuit being arranged to bias said trgger circuit conductive upon discharge.

2. A control circuit as claimed in claim 1 wherein said electrical load is comprised of headlamps and parking lamps together with a selector switch for alternatively connecting said headlamps or said parking lamps as said load.

3. A control circuit as claimed in claim 2, with additionally a self-latching switch having a pair of manually operable, normally open contacts and a holding coil energized when said contacts are closed manually to maintain said contacts closed;

means connecting one of said contacts to said selector switch for energizing said contact when said parking lamps are energized;

means connecting the other of said contacts to said trigger circuit for biasing said trigger circuit nonconductive whenever said other contact is energized; and means connecting said holding coil to said ignition switch to prevent said coil from being energized whenever said ignition switch is closed.

4. A control circuit as claimed in claim 1, wherein said trigger circuit comprises a pair of transistors, each having base, emitter and collector electrodes, the collector of one transistor being connected to the base of the other, and with the emitters of said transistors each connected to an opposite end of said relay coil.

5. A control circuit as claimed in claim 4, wherein said discharge circuit comprises a capacitor connected from the emitter to the base of one transistor;

a resistor connected from the base of said one transistor to the emitter of the other transistor; and a diode connected across said capacitor for conduction of current from said ignition switch to said relay coil.

References Cited

UNITED STATES PATENTS 3,210,613 10/1965 Prapis _____ 307—88.5 X
3,211,951 10/1965 Skinner et al. _____ 315—82 X JAMES W. LAWRENCE, *Primary Examiner.*

P. C. DEMEO, *Assistant Examiner.*